Figure 1:
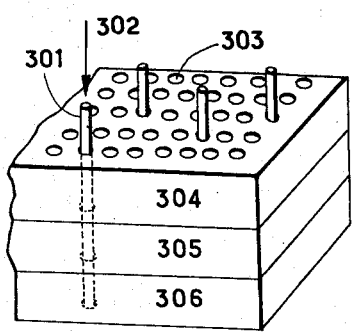

Nov. 2, 1965    H. PERRET ETAL    3,215,898

MATRIX SYSTEM

Filed Nov. 15, 1962    5 Sheets-Sheet 1

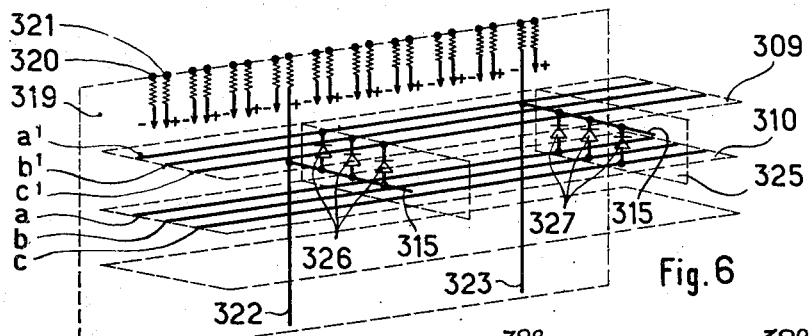
Fig. 6
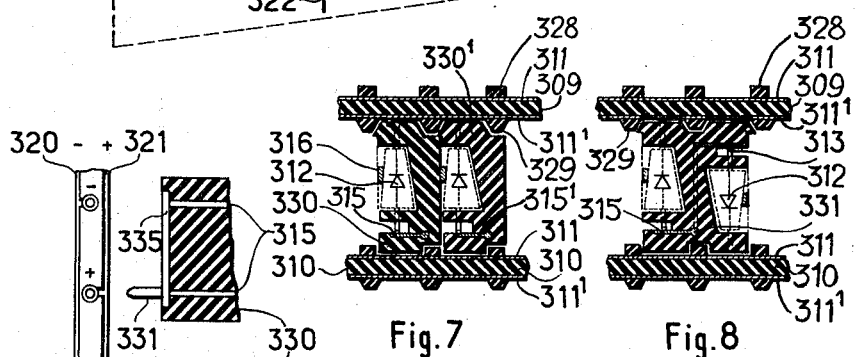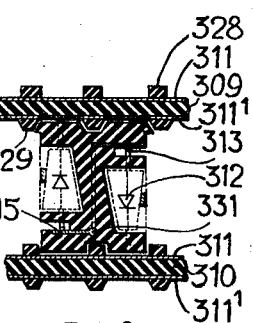
Fig. 7  Fig. 8
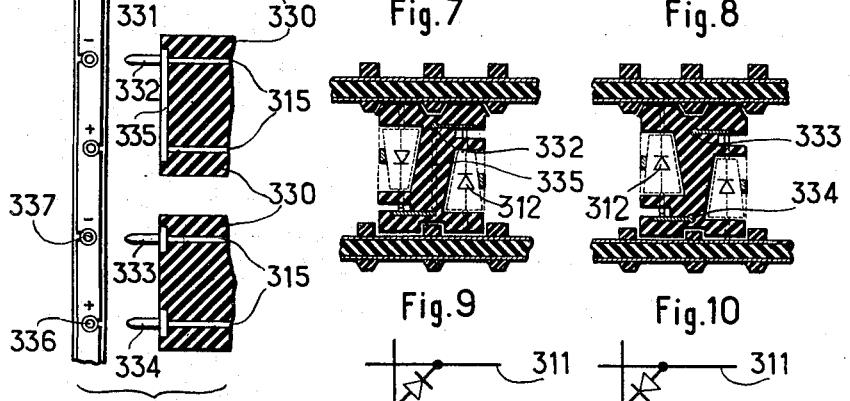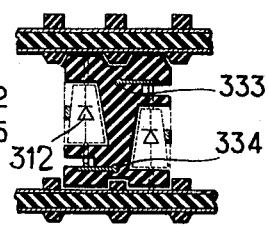
Fig. 9  Fig. 10
Fig. 11  Fig. 13  Fig. 14
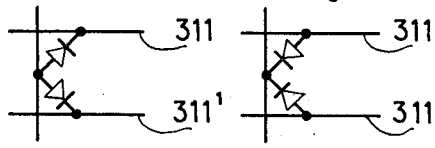
Fig. 12  Fig. 15  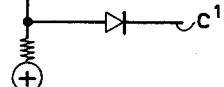 Fig. 16

United States Patent Office
3,215,898
Patented Nov. 2, 1965

3,215,898
MATRIX SYSTEM
Henri Perret and Claudine Perret, born Villain, Rueil Malmaison, France, assignors to Societe d'Applications Logiques de l'Electronique (Socap Electronique), Roubaix, France, a company of France
Filed Nov. 15, 1962, Ser. No. 237,986
Claims priority, application France, Nov. 29, 1961, 880,340, Patent 1,315,084
11 Claims. (Cl. 317—101)

The present invention relates to matrix systems and more particularly to those containing semi-conductor diodes or rectifier matrixes comprising a variable number of rigid plates which are in parallel spaced relation to each other and have rectilinear conductor networks on both sides, and removable devices permitting obtaining connections between selected points on said networks.

It is known to employ in various fields of application cross-bar matrix systems of this type comprising one or more stages and whose connections are obtained by means of simple plugs or diode-carrier plugs inserted in a direction perpendicular to the parallel planes of the matrix system in holes provided for this purpose.

These devices are not without disadvantages as concerns their construction and their utilization. The following disadvantages may in particular be mentioned:

These devices are of complex construction and employ conductors of complex forms and therefore require important and delicate machining and assembling operations which are consequently costly.

The number of sets of bars is maximum and constant for each stage of the matrix system, irrespective of the utilization and is therefore disproportionate in certain cases of utilization.

The length of the plugs must be proportional to the thickness of the stages traversed and this obviously limits the number thereof since, for a large number of stages, the length of the plugs would be prohibitive.

The modification of one or several stages in the course of utilization results in risks of error, since the same plug can be connected to several stages.

The limitation in the number of stages leads to the use of matrix systems of larger area which consumes space and requires more extensive cabling.

One of the objects of the present invention is to provide a cheaper system which is simpler in construction, easier to use, more sure in operation and comprises a greater number of circuits and combinations in a small volume.

Another object of the invention is to eliminate for this purpose the diode-carrier plugs having a prohibitive length and to avoid the assembly of unremovable cross-bars.

Another object of the invention is to employ means proportional to the needs and to provide an independent programming for each stage with the possibility of modifying one or several thereof without interfering with the others.

Another object of the invention is to make available under these conditions a larger number of stages and components and therefore to increase the capacity and possibilities of the system and attain new fields of application.

Another object of the invention is to provide matrix systems of smaller area which take up less space.

The matrix system according to the invention, which attains these objects is characterized in that, said networks are constituted by circuits all of which are parallel with one another and said matrix system further comprises a "common network" of conductors which are parallel with one another, perpendicular to said networks and contained in a plane perpendicular to the planes of the plates, and said removable devices are constituted by a series of a removable interchangeable component carrier means inserted between the plates perpendicular to said parallel circuits and to said common network, each of said component carrier means being so arranged as to be capable of receiving semi-conductor diodes and other components (such as capacitors, resistors, or transistors) which permits directly obtaining by their combination at least one logical circuit per component carrier.

According to another feature of the invention, there is provided a component carrier means which comprises conductors disposed transversely of the parallel circuits of the plates and perpendicular to the plane of the common network.

The combination of these component carrier means in the space between two parallel plates constitutes a matrix stage in which the lines of the matrix are constituted by the circuits of the lower face of the upper plate and by those of the upper face of the lower plate (each plate being therefore common to two stages), and in which the columns are constituted by the component carrier means, these component carrier means ensuring the electric connections with the conductors of the common network.

Means are provided for ensuring, on the one hand, the connection of the semi-conductor diodes and other components of the component carrier means with the common conductors of their component carrier means and the networks of the two plates which define each stage and, on the other hand, the connection of conductors of the component carrier means with the common network and the maintenance of the component carrier means in the desired position thereof.

The fact that the element carrier means are removable and interchangeable permits instantaneously modifying the assembly or order of a group of logical circuits without plugging, cabling or soldering.

Further features and advantages of the invention will be apparent from the ensuing description, with reference to the accompanying drawings to which the invention is in no way limited.

Figure 2:
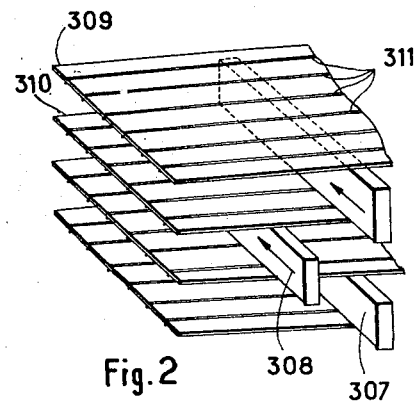
Figure 3:
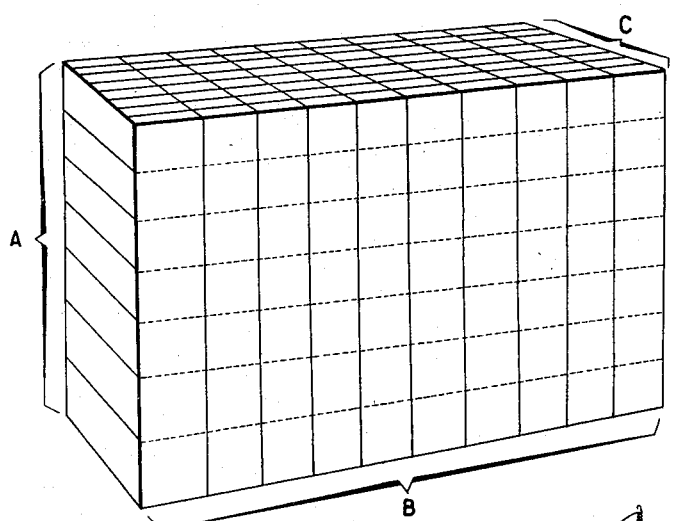
Figure 5:
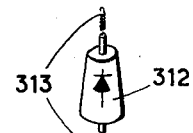
Figure 4:
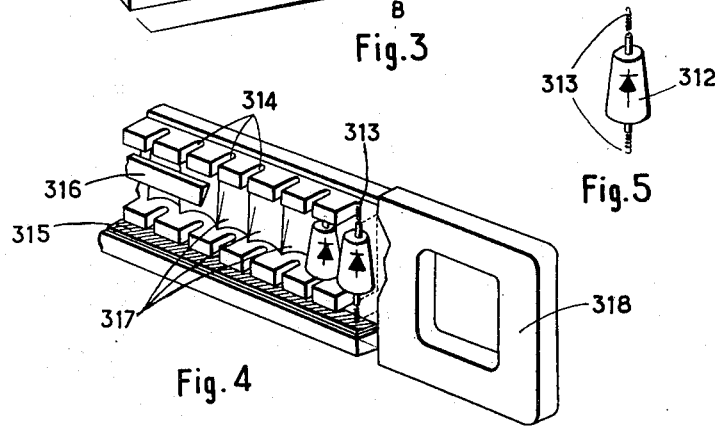
Figure 17:
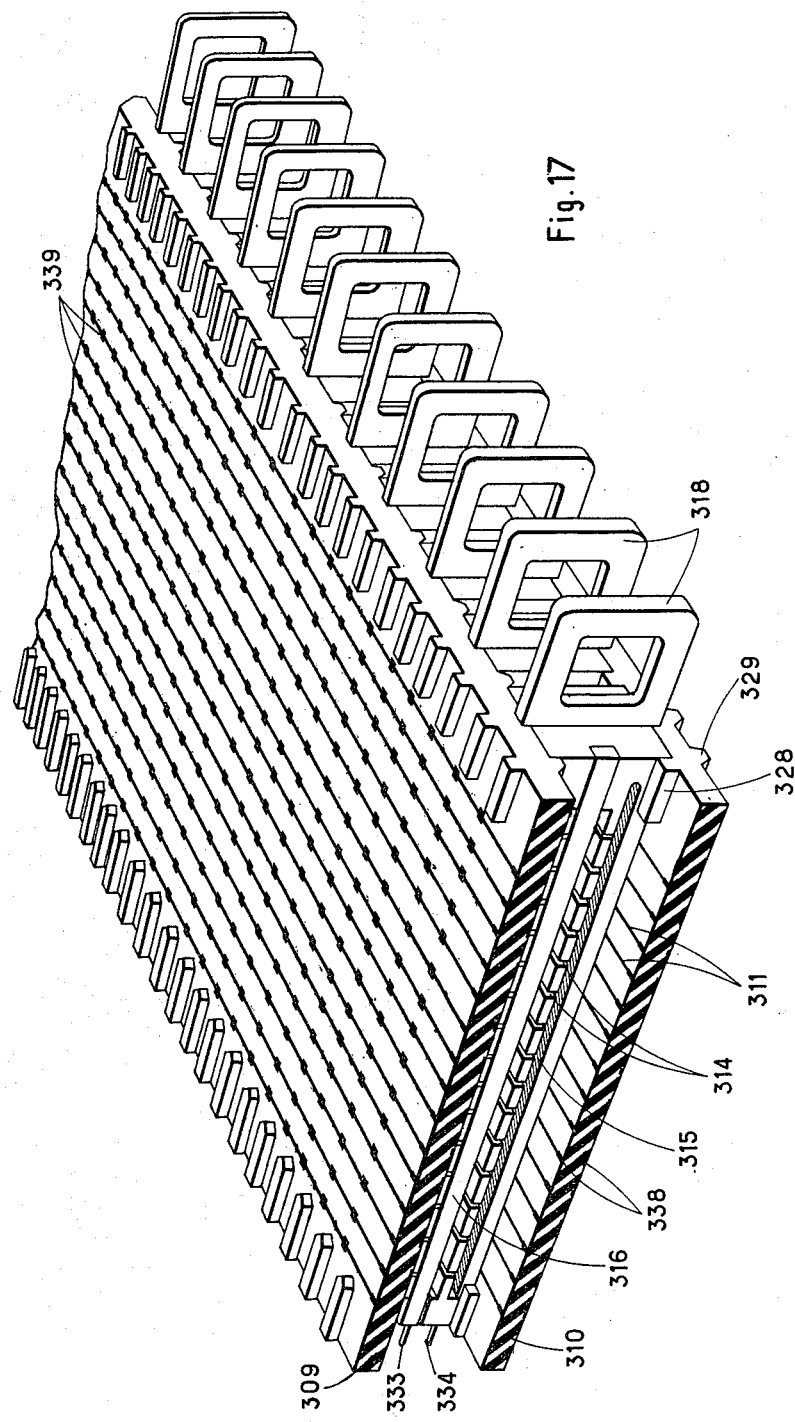
Figure 18:
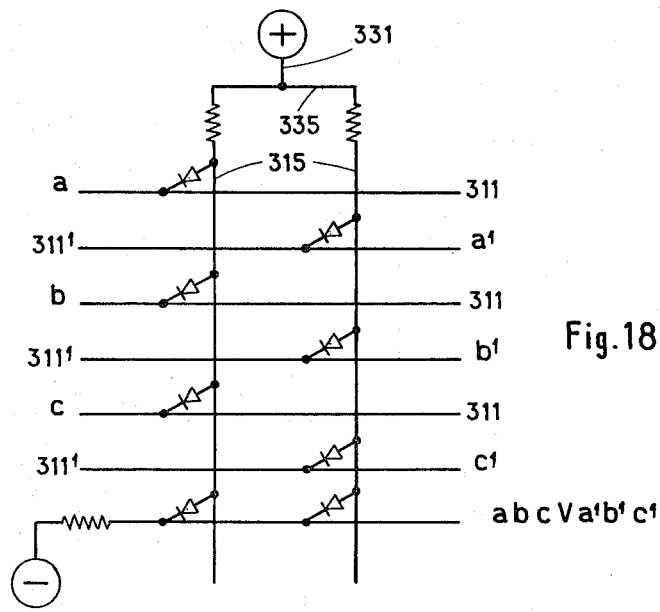
Figure 19:
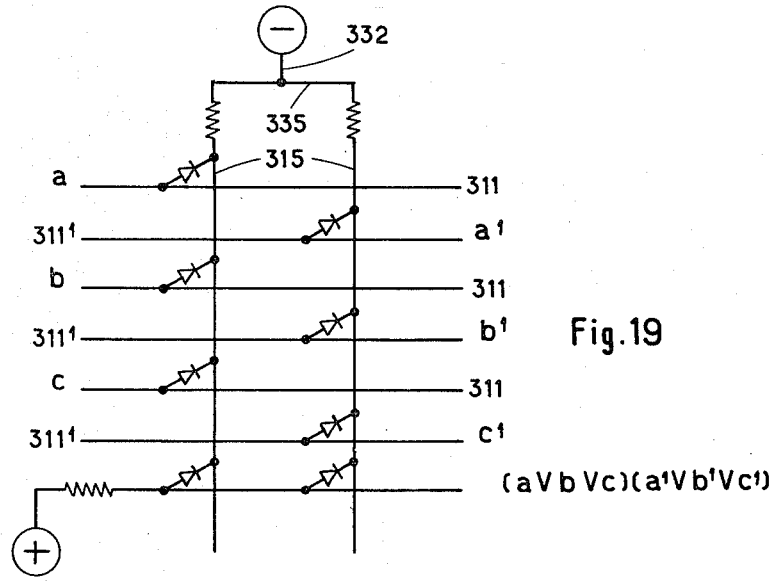

In the drawings
FIG. 1 is a partial view of a conventional stage matrix system;
FIG. 2 is a theoretical diagram of a matrix system according to the invention;
FIG. 3 is a diagram showing the three-dimensional characteristics of the system according to the invention;
FIG. 4 is a partial perspective view of a component carrier means according to the invention;
FIG. 5 is a perspective view of a semi-conductor diode showing its shape and structure;
FIG. 6 is a diagram illustrating the original set-up of the various elements according to the invention;
FIGS. 7, 8, 9 and 10 are cross-sectional views of various types of component carrier means according to the invention and their characteristics;
FIG. 11 is a view showing the different possible connections of the component carrier means with the networks of conductors of opposite potential;
FIGS. 12, 13, 14, 15 and 16 are diagrams showing variants of logical circuits obtained by the utilization of the component carrier means shown in FIGS. 7, 8, 9 and 10;
FIG. 17 is a perspective view of an embodiment of a part of a matrix stage according to the invention.
FIGS. 18 and 19 are diagrams of variants of application using the circuits shown in FIGS. 15 and 16, and
FIGS. 20 and 21 are perspective views of examples of applications of the invention, the first being applied to a machine-tool and the other to an accounting machine.

Identical elements are designated by identical reference characters.

FIG. 1 is a diagrammatic illustration of a matrix system of known type in which the plugs 301 are inserted in the direction of arrow 302 in holes 303 provided for this purpose through the plates 304, 305 and 306. It will be observed that increasing the number of plates renders the length of the plugs prohibitive.

FIG. 2 is a theoretical diagram showing a set of matrix systems according to the invention in which the component carrier means 307 are inserted in the direction of arrow 308 in the free space between the parallel planes or plates 309 and 310 transversely of the parallel conductor networks 311 located on both sides of these planes, these conductors being preferably formed by printed circuits. It is clear from this diagram that the length of the component carrier means does not depend on the number of stages.

FIG. 3 is a theoretical diagram showing the three-dimensional characteristics of the invention. In this diagram it will be observed that the selection of the matrix stages is effected on a vertical axis A; that of columns or phases on a longitudinal axis B; and that of the lines on a transverse axis C. According to the presently-described example, all of these lines can correspond to a sequential process.

Another feature of the invention is that owing to the great number of available stages, it is possible to select successively columns situated on the same vertical axis.

FIG. 4 is a partial perspective view of an embodiment in which according to the invention and by way of an example, to which the latter is not limited, the end portions 313 of the semi-conductor diodes are inserted in the openings or notches 314 provided for this purpose in the somewhat rack-like body of the component carrier means, each of the end portions of one end being in contact with a parallel conductor (mentioned hereinafter) whereas the opposite end portion rests on a common conductor or bus bar 315 (part of said component carrier means which input or output conductor depends on the the selected combination of diodes used, that is, conductive or non-conductive diodes. Each of the bodies of the diodes is disposed in a compartment 317 whose shape matches that of the body and which can if desired receive identifying designations. A removable strip 316 correctly maintains the diodes in their selected positions. The support terminates at one end in a ring or grip 318 whereby the support is easily gripped when it is inserted or extracted.

FIG. 5 is an embodiment of a semi-conductor diode given by way of example to which the invention is not intended to be limited and which shows certain required features. These components comprise in particular elastically yieldable end portions 313 which upon application of pressure ensure correct contacts, on the one hand, with their common conductor located on the component carrier means and, on the other hand, with their respective individual conductors. The body 312 is preferably in the form of a truncated cone which matches the shape of each individual housing or compartment formed in the component carrier means and prevents any inversion which would prevent the correct operation of the semi-conductors. It is thus clear with reference to FIG. 4 that the semi-conductor components can be easily placed in position. Indeed, the diodes are merely placed in the selected housings and then retained therein by the strip 316 which constitutes a pressure clip.

FIG. 6 is a diagram of connections of the various networks of the conductors situated on their respective planes or plates. To this end, the plane 319, termed the "common" plane perpendicular to the planes 309 and 310 and represented by dotted lines, comprises pairs of parallel conductors, such as 320 and 321 of opposite potential and termed "common network conductors." Each conductor can receive at each of the adjacent stages the connection of a corresponding component carrier means, such as shown in the diagram where a positive common conductor 322 is connected with the bus bar 315 of a component carrier means 324 shown in dotted lines, whose diodes 326 have their end portions connected, on the one hand to the bus bar 315 of this means and, on the other hand, to each of the parallel conductors of the lower face of the plane 309 shown in dotted lines. Another vertical conductor 323 of negative potential is connected with the bus bar 315 of a component carrier means 325 whose diodes 327 have their end portions connected, on the one hand, to their bus bar 315 and, on the other hand, with each of the conductors parallel with the upper face of the plane 310. It should be noted that in the absence of any programming (effected without cabling), the space between the upper plane 309 and the lower plane 310, for example, is free of any device, such as sets of bars or partitions.

FIG. 7 is a cross-sectional view of two component carrier means 330 and 330$^1$ inserted between an upper horizontal plane or plate 309 and the same lower plane or plate 310 each of which has on both faces parallel conductors 311 and 311$^1$ preferably constituted by printed circuits. These parallel plates also comprise guide ribs 328 on their upper faces and guide ribs 329 on their lower faces. These ribs of different sections for each face are situated transversely on both sides of the parallel conductor networks so as to facilitate the insertion and positioning and to retain the component carrier means. In this figure, each of the two component carrier means comprises a row of diodes 312 which are retained by the strips 316 and whose end portions rest, on the one hand, on their bus bars 315 and, on the other hand, on each of their individual conductors 311$^1$.

FIG. 8 is a cross-sectional view of a different type of component carrier means comprising two rows of diodes disposed as shown. To this end the bus bars 315 are connected at one end by a strip 335 which is shown in dotted line and terminated in a male plug 331 connected to a positive conductor of the common network.

FIG. 9 shows a double type of component carrier means having a different arrangement in which the strip 335 connecting the aforementioned common conductors terminates in a male plug 332 connected with a negative conductor of the common network.

The arrangements of FIGS. 7, 8 and 9 correspond to the conventional diagrams of rectifier matrix systems shown in FIGS. 12, 13 and 14.

FIG. 10 also shows double component carrier means but in which each row of diodes is connected differently, the bus bar 315 of each row terminating either in an individual plug 333 connected to a negative conductor of the common network or in a plug 334 connected to a positive conductor of the common network. According to a feature of the invention, the network leading to the plug 333 is that shown in FIG. 15 and comprises an "OR" gate for positive signals. The network connected to the plug 324 corresponds to that shown in FIG. 16 and forms an "AND" gate for positive signals. FIGS. 18 and 19 illustrate two modifications or variations in the circuits shown in FIGS. 15 and 16. As indicated by the legend appearing adjacent the lowermost conductor in FIG. 18, this figure of the drawings illustrates a network in which a more positive potential is applied to the output line whenever all of the inputs $a$, $b$, and $c$ or all of the inputs $a'$, $b'$, and $c'$ receive a positive input signal. In the circuit shown in FIG. 19 and as represented by the notation appearing adjacent the lowermost conductor, a more positive potential is applied to this line whenever one of the inputs $a$, $b$, and $c$ and one of the inputs $a'$, $b'$, or $c'$ receives a positive input signal. It will be observed that there is thus obtained on the same component carrier means (FIG. 10) the fundamental INTERSECTION ("AND" logical circuit) and the fundamental ADDITION ("INCLUSIVE OR" logical circuit) permitting ADDITIONS of terms of INTERSECTION and INTERSECTIONS of terms of ADDITION.

FIG. 11 shows how the connection of the component carrier means is obtained, bearing in mind their characteristics indicated in FIGS. 7, 8, 9 and 10, with the bipolar conductors of the "common" plane 319. To this end, a negative conductor 320 and another positive conductor 321 is shown facing superimposed component carrier means each partially shown, in longitudinal median section 330. In stage A, corresponding to the arrangement shown in FIG. 8, the bus bars 315 united by a strip 335 terminate in a common male plug 331 which is adapted to be inserted in the female socket 336 of the positive conductor 321. In stage B, corresponding to the arrangement shown in FIG. 9, the bus bars 315 of the component carrier means are connected by a connection strip 335 and terminate in a male plug 332 which is adapted to be inserted in the female socket 337 of the negative conductor 320. In the stage C, corresponding to the arrangement shown in FIG. 10, each bus bar 315 terminates respectively in male plugs 333 and 334 which are adapted to be inserted, one in the female socket 337 of the negative conductor 320, and the other in the female socket 336 of the positive conductor 321. As concerns the arrangement shown in FIG. 7, not shown in FIG. 11, this arrangement would comprise only one conductor terminating in a male plug corresponding in the case under consideration to a female socket of the positive conductor 321.

FIG. 17 is an embodiment of the invention corresponding to a part of a stage explaining the foregoing description, embodiments and arrangements. To this end, all the previously-mentioned elements are regrouped in this drawing where, according to a feature of the invention, the networks of the parallel conductors on each of the faces of the neighbouring plates comprise, on the one hand, end connection areas 338 and, on the other hand, matrix connection areas 339 corresponding to the positioning of the different rows of diodes disposed on their component carrier means.

Means are provided for ensuring the regeneration of electric impulses, their conversion into electronic impulses, and the amplification of the latter in accordance with the requirements of the applications and utilisations.

It should be noted, furthermore, that the forms and characteristics of the component carrier means can be obtained in mass-production by industrial moulding which enables these means to act as a support for miniature components other than the described semi-conductors, such as resistors, capacitors, inductors, transistors, owing to the particular disposition of the mentioned circuits.

Figure 20:
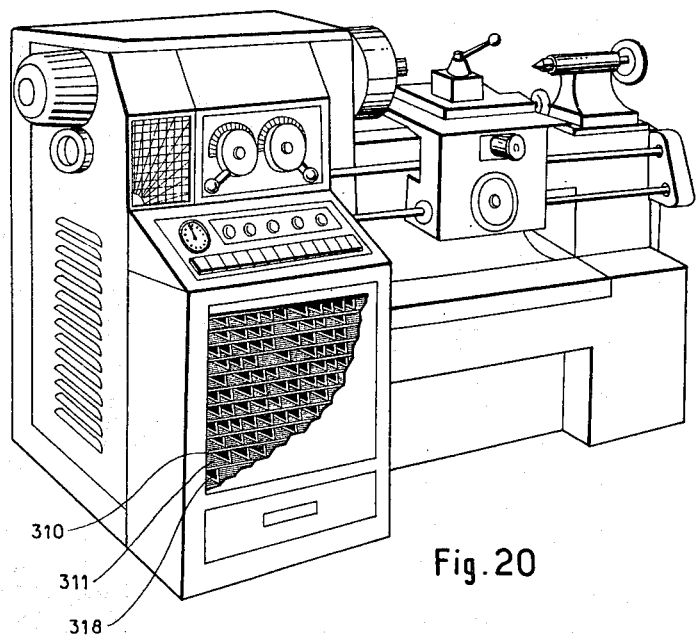
Figure 21:
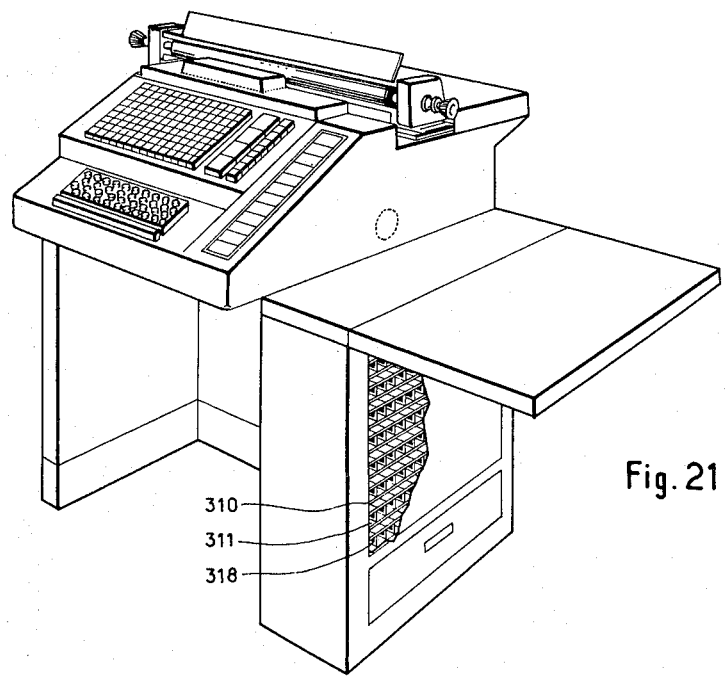

FIGS. 20 and 21 show the application of the described matrix systems, one of which concerns a machine-tool and the other an accounting machine.

The system according to the invention permits solving, among others, problems of sequential automatism set by the programming of accounting machines or machine-tools as well as those set by technical information of scientific research.

Having now described our invention what we claim as new and desire to secure by Letters Patent is:

1. A matrix system comprising straight parallel longitudinal rows of coplanar contacts arranged in a first plane, fixed guide means parallel with said rows and arranged in a second plane, component carrier means having guide means slidably engaged with said fixed guide means, the component carrier means having resilient contact means projecting out of the component carrier means perpendicular to said planes and making individual contact with the fixed coplanar contacts, and electronic components removably housed along longitudinal rows in the component carrier means extending transverse to the first plane, the electric components being connected to the resilient contact means.

2. A matrix system comprising a plurality of coplanar contacts uniformly spaced apart along straight parallel longitudinal and transverse fixed rows in a first fixed plane, straight fixed guide means parallel with the longitudinal rows and arranged in a second fixed plane parallel to said first plane and spaced apart therefrom, component carrier means having both longitudinal guide means slidably engaging said fixed guide means and a longitudinal planar face parallel with said planes, at least one longitudinal row of electronic components arranged transversely in said component carrier means, and contact means projecting through said longitudinal planar face perpendicular to said fixed planes and connected to said components inside of said component carrier means, said contact means making individual electric contact with the contacts in one of said longitudinal fixed rows of coplanar contacts.

3. A matrix construction comprising a substantially rectangular frame having two longitudinal members, longitudinal guide means formed on at least one of said longitudinal members, at least one elongated carrier structure mounted on said frame, said structure including both two longitudinal parallel ribs and a component carrying body extending between said ribs, at least one of said ribs cooperating with the guide means to removably position the carrier structure on the frame, said body having a longitudinal row of transversely extending component receiving spaces, a plurality of electronic components mounted in the spaces, each of said ribs having a row of transverse apertures opening into said spaces, and electric connecting means connected with the components housed in said spaces and projecting outwardly through said apertures perpendicular to said longitudinal members.

4. A matrix system comprising a plurality of coplanar electric contacts uniformly spaced apart to form a straight row, fixed guide means parallel with said row and spaced apart from said row, component carrier means having two longitudinal members removably engaging said fixed guide means, a longitudinal row of compartments in the carrier means, a plurality of components mounted in the compartments, a row of transverse apertures in said carrier means opening into said compartments and spaced apart distances equal to the spacing of said row of coplanar electric contacts, and resilient electric connecting means connected to the components housed in said compartments and projecting outwardly through said apertures, said electric connecting means making electric contact with the coplanar electric contacts.

5. A matrix system comprising a plurality of generally coplanar electric contacts uniformly spaced apart to form longitudinal parallel rows arranged in a first plane, fixed guide means parallel with said rows and arranged in a second plane, a number of parallel component carrier means, each of said component carrier means comprising a substantially rectangular frame having at least one longitudinal part engaging said fixed guide means so that each component carrier means can be longitudinally inserted on said fixed guide means between said two planes, a longitudinal row of transverse compartments in each carrier means, a longitudinal rib on each carrier means at such distance from said longitudinal part that said rib slides on said coplanar electric contacts when the longitudinal part is engaged with said fixed guide means to slide the component carrier means longitudinally between said planes, said rib having a row of transverse openings opening into said compartments and spaced apart distances equal to the spacing of said coplanar electric contacts, and electric connecting means connected to components housed in said compartments and projecting outwardly through said openings, said electric connecting means making electric contact with the coplanar electric contacts.

6. A matrix according to claim 5 including additional electric connecting means connecting said coplanar electric contacts along transverse rows perpendicular to said longitudinal rows, said matrix further including a network of conductors connected to the contacts of each transverse row.

7. A matrix system comprising a plurality of coplanar electric contacts uniformly spaced apart and forming parallel rows arranged in a first plane, fixed guide means parallel with said rows and arranged in a second plane, and a number of parallel component carrier means, each of said component carrier means including two longitudinal portions engaging said fixed guide means whereby said component carrier means can be longitudinally inserted on said fixed guide means between said two planes, a longitudinal row of transverse compartments on each carrier means, a longitudinal bus bar within each component carrier means, electronic components removably housed in at least some of the compartments, first electric connecting means connecting said components to said bus bar, and second electric connecting means connected to said components and projecting transversely out of said component carrier means to form a row of contacts which make individual electric contact with contacts of one of said rows of coplanar electric contacts.

8. A matrix system according to claim 5, wherein each of said component carrier means includes a third electric connecting means connected to one end of the bus bar, and a grip fixed to the carrier means opposite said one end of the bus bar.

9. A matrix system comprising a first plurality of coplanar electric contacts uniformly spaced apart to form parallel rows arranged in a first plane, a second plurality of coplanar electric contacts uniformly spaced apart forming rows parallel with said first rows and arranged in a second plane parallel with said first plane, first and second sets of fixed guide means parallel with said rows of coplanar contacts and arranged in said first and second planes, a number of component carrier means each having two longitudinal portions forming first and second guide means engaging said first and second fixed guide means to permit the component carrier means to be inserted between said two planes, a longitudinal row of transversely extending compartments on each side of each carrier means for removably housing electronic components therein, the compartments of each row opening in a direction opposite to that of the other row and being staggered relative to those of the other row, two longitudinal bus bars carried on said component carrier means on opposite sides thereof, electronic components removably housed in at least some of the compartments, first electric connecting means connecting the components of the two rows to the corresponding bus bars, and first and second resilient contact means connected to the components in said first and second rows of compartments and projecting outwardly on opposite sides of the component carrier means to form two longitudinal rows of marginal contacts, said marginal contacts making individual electric contact with the contacts of two related rows of the coplanar contacts.

10. A matrix system according to claim 9, wherein each of said component carrier means includes two connecting means connected to one end of each of said bus bars at one end of said component carrier means.

11. A matrix system comprising a pair of parallel plates in spaced relation to each other, a plurality of coplanar contacts on one plate aligned along longitudinal parallel rows and parallel transverse rows perpendicular to each other, a plurality of longitudinal guide means on the other plate parallel to said longitudinal rows, a plurality of component carrier means having longitudinal guide means matching said fixed guide means to slide said component carrier means between said plates, each of said component carrier means having a longitudinal planar face parallel with said plates, a longitudinal row of transverse compartments arranged in each component carrier means, electronic components in at least some of said compartments, and marginal electric connecting means connected to said components and projecting through a row of apertures in said longitudinal planar face, said marginal electric connecting means making electric contact with the coplanar contacts of the longitudinal rows, a longitudinal bus bar carried on said component carrier means, first electric connecting means fixed to one end of said bus bar, and a common network comprising coplanar second electric connecting means arranged in a plane perpendicular to said longitudinal direction for engaging said first electric connecting means.

References Cited by the Examiner
UNITED STATES PATENTS

| | | | |
|---|---|---|---|
| 2,702,879 | 2/55 | Wheeler | 317—99 |
| 2,749,484 | 6/56 | Levitt | 317—99 |
| 2,824,264 | 2/58 | Anastopoulos | 317—99 |
| 2,872,624 | 2/59 | Belek et al. | 339—17 |
| 3,001,171 | 9/61 | Schultz | 317—101 |
| 3,130,351 | 4/64 | Giel | 317—101 |

FOREIGN PATENTS 202,490    3/55    Australia.

JOHN F. BURNS, *Primary Examiner.*

LARAMIE L. ASKIN, *Examiner.*